(12) United States Patent
Mazumder

(10) Patent No.: US 7,286,893 B1
(45) Date of Patent: Oct. 23, 2007

(54) TAILORING RESIDUAL STRESS AND HARDNESS DURING DIRECT METAL DEPOSITION

(76) Inventor: Jyoti Mazumder, 5074 Birkdale, Ann Arbor, MI (US) 48103

( * ) Notice: Subject to any disclaimer, the term of this patent is extended or adjusted under 35 U.S.C. 154(b) by 684 days.

(21) Appl. No.: 09/608,874

(22) Filed: Jun. 30, 2000

Related U.S. Application Data

(63) Continuation-in-part of application No. 09/107,912, filed on Jun. 30, 1998, now Pat. No. 6,122,564.

(60) Provisional application No. 60/142,126, filed on Jul. 2, 1999.

(51) Int. Cl.
G06F 19/00 (2006.01)

(52) U.S. Cl. .............. 700/145; 700/119; 219/121.85; 219/121.66; 29/402.18; 419/25

(58) Field of Classification Search ............. 700/123, 700/118, 119, 120, 145, 166, 212, 207; 228/158; 427/555; 419/45, 25; 219/121.6, 121.76, 219/121.65, 121.66, 121.85; 29/402.18
See application file for complete search history.

(56) References Cited

U.S. PATENT DOCUMENTS

| | | | |
|---|---|---|---|
| 4,044,774 A | 8/1977 | Corbin et al. | 128/404 |
| 4,323,756 A | 4/1982 | Brown et al. | 219/121.66 |
| 4,411,258 A | 10/1983 | Pujals, Jr. | 128/60 |
| 4,626,999 A | 12/1986 | Bannister | 700/166 |
| 4,633,889 A | 1/1987 | Talalla et al. | 128/784 |
| 4,665,298 A * | 5/1987 | La Rocca | 219/121.6 |
| 4,724,299 A | 2/1988 | Hammeke | 219/121.6 |
| 4,803,986 A | 2/1989 | Dufresne et al. | 128/385 |
| 4,915,757 A | 4/1990 | Rando | 156/64 |
| 5,031,618 A | 7/1991 | Mullett | 128/421 |
| 5,041,974 A | 8/1991 | Walker et al. | 364/413.27 |
| 5,094,977 A * | 3/1992 | Yu et al. | 438/653 |
| 5,196,015 A | 3/1993 | Neubardt | 606/61 |
| 5,208,431 A * | 5/1993 | Uchiyama et al. | 219/121.65 |
| 5,303,141 A | 4/1994 | Batchelder et al. | 700/29 |
| 5,342,409 A | 8/1994 | Mullett | 607/46 |

(Continued)

OTHER PUBLICATIONS

B. L. Averbach, "Heat treatment (metallurgy)", in AccessScience@McGraw-Hill, http://www.accessscience.com, DOI 10.1036/1097-8542.311200, last modified: May 13, 2002.*

(Continued)

*Primary Examiner*—Leo Picard
*Assistant Examiner*—Steven R. Garland
(74) *Attorney, Agent, or Firm*—Gifford, Krass, Sprinkle, Anderson & Citkowski, PC

(57) ABSTRACT

In a direct-metal deposition (DMD) process used to deposit successive layers in accordance with instructions from a CAD/CAM program, the laser beam, or an additional beam, is deployed as a localized heat treatment tool instead of a deposition tool. The use of laser energy during the process can minimize, if not eliminate, the periodic heat treatments now required for stress alleviation, thereby compressing the DMD fabrication cycle. In the preferred embodiment, every deposition run may be followed by a dry (i.e., without powder) run of one or more intensities to manipulate the stress magnitude and location. Since it is well known that residual stress is a function of cooling rate, a plurality of laser beams may alternatively be used to control the cooling rate of the deposited layer. Examples of stress reduction using H13 tool steel are provided.

9 Claims, 4 Drawing Sheets

U.S. PATENT DOCUMENTS

| | | | |
|---|---|---|---|
| 5,352,405 A * | 10/1994 | Beaman et al. | 419/45 |
| 5,358,513 A | 10/1994 | Powell, III et al. | 607/46 |
| 5,423,877 A | 6/1995 | Mackey | 607/117 |
| 5,427,825 A * | 6/1995 | Murnick | 427/555 |
| 5,474,558 A | 12/1995 | Neubardt | 606/79 |
| 5,501,703 A | 3/1996 | Holscheimer et al. | 407/46 |
| 5,612,887 A | 3/1997 | Laube et al. | 700/119 |
| 5,642,287 A | 6/1997 | Sotiropoulos et al. | 700/166 |
| 5,643,330 A | 7/1997 | Holscheimer et al. | 607/46 |
| 5,659,479 A | 8/1997 | Duley et al. | 700/166 |
| 5,746,844 A * | 5/1998 | Sterett et al. | 148/522 |
| 5,837,960 A | 11/1998 | Lewis et al. | 219/121.63 |
| 6,269,540 B1 * | 8/2001 | Islam et al. | 29/402.18 |
| 6,443,352 B1 * | 9/2002 | White | 228/158 |

OTHER PUBLICATIONS

U.S. Appl. No. 60/103,052.*

W.M. Steen, "Laser-Material Processing," 1998 Springer, Chap. 7 & 8 (pp. 272-320).

E. Renier et al, CCD Technology Applied To Industrial Welding Applications, IEEE datbase, and pp. 1335-1338, May 1996.

R Meriaudeau et al., Acquisition and Image Processing System Able To Optimize Laser Cladding Process, IEEE database, pp. 1628-1631, 1996.

Jyoti Mazumder, Advanced Laser Processing of Metals, IEEE database, pp. 23-25, date unknown.

* cited by examiner

TAILORING RESIDUAL STRESS AND HARDNESS DURING DIRECT METAL DEPOSITION

REFERENCE TO RELATED APPLICATIONS

This application claims priority of U.S. provisional application Ser. No. 60/142,126, filed Jul. 2, 1999, and is a continuation-in-part of U.S. patent application Ser. No. 09/107,912, filed Jun. 30, 1998, now U.S. Pat. No. 6,122,564 the contents of both of which are incorporated herein by reference.

FIELD OF THE INVENTION

This invention relates generally to direct metal deposition (DMD) and, more particularly, to apparatus and methods for reducing residual stress accumulation and tailoring the hardness of components fabricated using DMD.

BACKGROUND OF THE INVENTION

With direct-metal deposition, or DMD, a laser-aided, computer-controlled system applies layers of material on a substrate to fabricate an object or to provide a cladding layer. Preferably, the DMD system is equipped with feedback monitoring to control the dimensions and overall geometry of the fabricated article in accordance with a computer-aided design (CAD) description. The deposition tool path is generated by a computer-aided manufacturing (CAM) system for CNC machining, with post-processing software for deposition, instead of software for removal as in conventional CNC machining. Background for the laser-aided DMD process can be found in "Laser Material Processing," W. M. Steen, 1998 Springer, and in U.S. patent application Ser. No. 09/107,912, filed Apr. 10, 1997, which is incorporated herein by reference.

During the process of laser-aided DMD, whether for cladding or product fabrication, residual stresses may accumulate and lead to distortion and premature failure of the finished article during its use or operation. When the accumulated residual stresses exceed the yield strength of the material, cracking often occurs during the fabrication process. Thermal expansion and sometimes phase transformation are the main contributors to residual stress. Most steels, for example, change from austenite with face-centered cubic structure (FCC) to martensite with body-centered tetragonal crystal structure (BCT) above a certain critical cooling rate. The specific volume of BCT is 4% higher than that of FCC, and therefore martensitic transformation produces considerable stress.

Although there are several techniques for post-mortem, i.e., after fabrication or after failure, measurement of stress accumulation, these techniques are not timely and do not save the product. To alleviate the problem, periodic heat treatment is often needed. On the other hand, for cyclic loading applications, compressive residual stress improves the service life. Location and relative magnitude of stress are also important for the control of distortion. Residual stress also influences hardness. Therefore, a method for tailoring the magnitude, location and direction of residual stress has a considerable potential to influence the service life and quality of components manufactured by DMD.

SUMMARY OF THE INVENTION

Direct-metal deposition (DMD) is achieved by melting powders with a laser having a well-defined thermal field. The DMD process may be used to fabricate three-dimensional components by depositing successive layers in accordance with instructions from a CAD/CAM program. Broadly, this invention recognizes that without the powder, the laser beam, or an additional beam, may be deployed as a localized heat treatment tool instead of a deposition tool. The use of laser energy during the process can minimize, if not eliminate, the periodic heat treatments now required for stress alleviation, thereby compressing the DMD fabrication cycle.

In alternative embodiments, the laser in the DMD process can be utilized for controlling residual stress in at least the following ways:

1) Every deposition run may be followed by a dry (i.e., without powder) run of one or more intensities to manipulate the stress magnitude and location; or 2) Since it is well known that residual stress is a function of cooling rate, a plurality of laser beams may be used to control the cooling rate of the deposited layer.

DETAILED DESCRIPTION OF THE INVENTION

Figure 1:
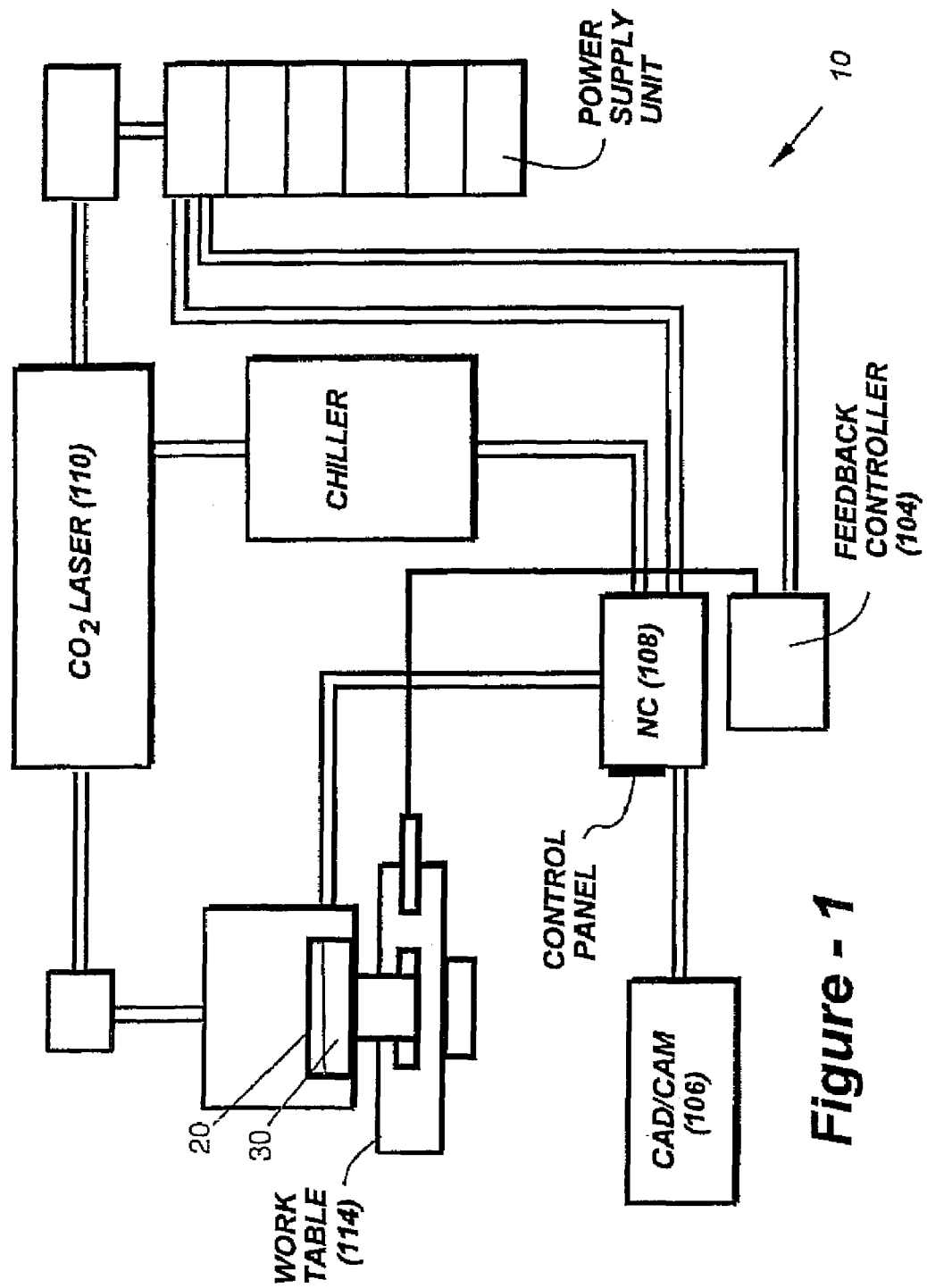
FIG. 1 is a schematic diagram of a laser-aided direct-metal deposition (DMD) system.

Making reference to FIG. 1, laser-aided, computer controlled direct material deposition (DMD) system 10 applies layers of material 20 on a substrate 30 to fabricate an object or cladding. The system is preferably equipped with feedback monitoring to control the dimensions and overall geometry of the fabricated article. The geometry of the article is provided by a computer-aided design (CAD) system.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. patent application Ser. No. 09/107,912, which is fully incorporated herein by reference, and are not all explicitly shown in FIG. 1.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 80 of the direct material deposition system typically cooperates directly with the numerical controller 90, which, itself, controls all functions of the direct material deposition system, including laser power.

The laser source 110 of the DMD system is mounted above the substrate 30 and a layer of material 20 is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path across the substrate for material deposition.

Residual stress accumulation and hardness of components fabricated by direct metal deposition (DMD) are important parameters for post processing and service life of the finished component. Excessive stress accumulation during the process can lead to failure of the component. Thermal stress is responsible for residual stress accumulation in most materials. For ferrous metals, martensitic transformation contributes additional stress. Clearly, management of stress accumulation during the direct material deposition process is critical for the production of non-defective components with close tolerances and precise dimensions.

The production of H13 tool steel samples/parts using laser-aided DMD will be used to illustrate the ways in which the invention manages residual stress buildup. In these examples, the same laser used for powder melting is used for heat treatment. However, it will be apparent to one of skill in the art that the inventive concepts disclosed herein are equally applicable to other materials, including other metals and alloys, and that one or more lasers in addition to the beam used for deposition may be employed to speed fabrication. In particular, the beam used for melt-pool creation may be "followed" by one or more other beams, thereby obviating the need to retrace the deposition path with a dry run.

The high magnitude of residual stress entrapment in the sample is a major impediment to the fabrication of H13 tool steel components using the DMD process. To minimize this residual stress accumulation, the common practice is, after making a specified number of layers, to temporarily terminate deposition to carry out a stress relieving operation. This shifting between deposition and stress-relieving processes continues until the sample is completed. Occasionally the stress relieving operations degrade some other important material properties such as the strength of the fabricated part in addition to prolonging the processing time. However, according to the invention, by reheating each layer using the same laser, or one or more additional lasers at a lower power density, residual stress buildup is reduced substantially.

In the preferred embodiment, a reheating cycle is carried out after depositing each layer. During this reheating process the beam is preferably defocused used to ensure that power density does not reach that level when remelting might occur in the deposited material. The process continues until the completion of making the sample.

EXAMPLE

A continuous-wave $CO_2$ laser was used in the pulse mode for fabricating samples in accordance with the invention. The dimension of each sample was 1"×0.5"×0.5". It is worthwhile to mention here that the objective for this experiment was to determine whether in-process laser reheating is effective or not in minimizing the residual stress. Another goal was to determine how laser power, defocus, travel speed and number of reheating cycle affect the residual stress buildup in the sample. Thus, for each deposition cycle, all parameters were kept the same for the entire experiment, and the statistical design of experiment was based on the parameters used for reheating only. In actual practice, the fixed parameters may be varied in accordance with desired material characteristics.

The parameters used for the deposition are given in Table 1

TABLE 1

Parameters used for deposition cycle

| Power (actual) W | Travel speed ipm | Mass flow rate gm/min | z-increment in | Defocus in |
|---|---|---|---|---|
| 400 | 26.40 | 6 | 0.01 | 0.02 |

For deposition purposes, helium was used for both shield and delivery gas. Gas flow rate for shielding purposes was 30 cufth while it was 15 cufth for delivery. Mild steel was used as the substrate for this experiment.

For reheating the design matrix is given in Table 2:

TABLE 2

Parameters and their levels used for reheat cycle

| Sample # | Sample Id | Power w | Reheat | Beam Dia in inch | Defocus Inch | Speed ipm | Max P. Strs. |
|---|---|---|---|---|---|---|---|
| 1 | 1R | 170 | Once | 0.0346 | 0.45 | 11.7602 | 2.316667 |
| 2 | 2R | 170 | Once | 0.0653 | 0.65 | 20.54045 | 8.666667 |
| 3 | 3R | 170 | Once | 0.0830 | 0.85 | 29.3207 | 16.96667 |
| 4 | 4R | 170 | Twice | 0.0346 | 0.45 | 20.54045 | 4.35 |
| 5 | 5R | 170 | Twice | 0.0653 | 0.65 | 29.3207 | 1.966667 |
| 6 | 6R | 170 | Twice | 0.0830 | 0.85 | 11.7602 | 5.666667 |
| 7 | 7R | 170 | Twice | 0.0346 | 0.45 | 29.3207 | 7.616667 |
| 8 | 8R | 170 | Twice | 0.0653 | 0.65 | 11.7602 | 14.46667 |
| 9 | 9R | 170 | Twice | 0.0830 | 0.85 | 20.54045 | 19.46667 |
| 10 | 10R | 260 | Once | 0.0346 | 0.45 | 29.3207 | 13.56667 |
| 11 | 11R | 260 | Once | 0.0653 | 0.65 | 11.7602 | 0.883333 |
| 12 | 12R | 260 | Once | 0.0830 | 0.85 | 20.54045 | 7.7 |
| 13 | 13R | 260 | Twice | 0.0346 | 0.45 | 11.7602 | 20.03333 |
| 14 | 14R | 260 | Twice | 0.0653 | 0.65 | 20.54045 | 6.066667 |
| 15 | 15R | 260 | Twice | 0.0830 | 0.85 | 29.3207 | 12.96667 |
| 16 | 16R | 260 | Twice | 0.0346 | 0.45 | 20.54045 | 15.16667 |
| 17 | 17R | 260 | Twice | 0.0653 | 0.65 | 29.3207 | 1.75 |
| 18 | 18R | 260 | Twice | 0.0830 | 0.85 | 11.7602 | 9.583333 |
| 19 | 19NR | | | | | | 15.78333 |
| 20 | 20NR | | | | | | 20.43333 |
| 21 | 21NR | | | | | | 20.31667 |

A commercially available statistical package, JMP, was used for determining the desired kind of design matrix. It was a mixed design as there are 2 factors with 2 levels and 2 factors for 3 levels. According to this design, 18 total runs were used to find contrasts between all the main effects and only 3 cross-factor effects. This design was simple enough to serve our purpose. Total number of samples for this experiment was 27 i.e. another 9 sample were made that were not included in this mixed design matrix. Out of these extra 9 samples, 3 samples were made without reheating, another 5 with reheat plus insulation (wood was used under the mild steel substrate so that over all temperature during making of the samples may be kept at higher level). Finally, a single sample was made using only insulation but no reheating to see how insulation affects the residual stress accumulation in the sample.

Figure 2:
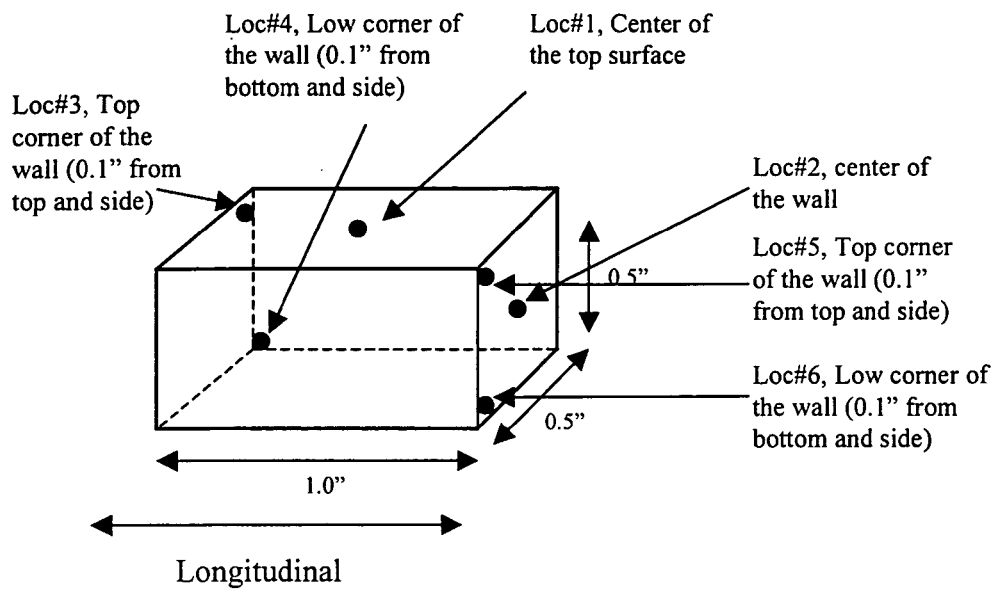
FIG. 2 is a drawing used to show X-ray diffraction measurement locations in a workpiece.
Figure 3:
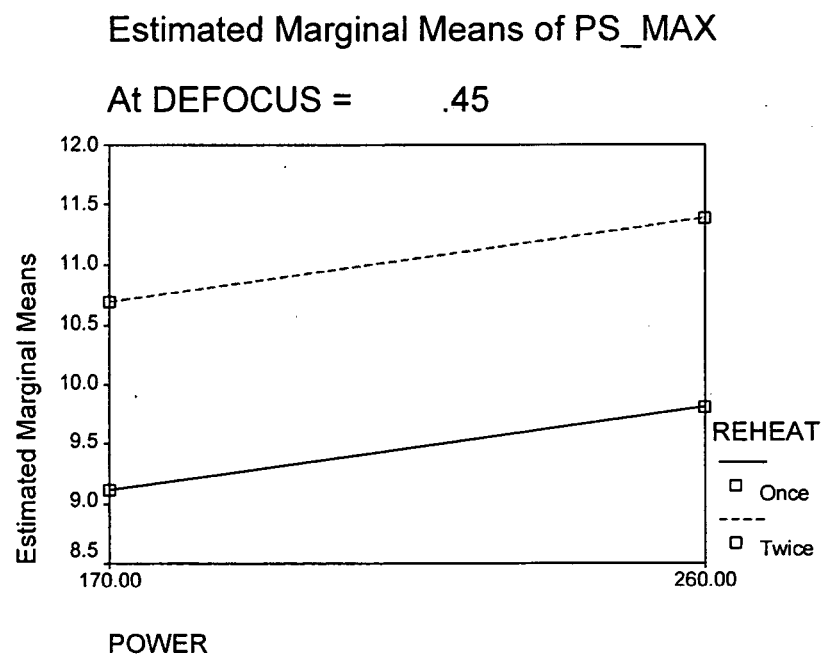
FIG. 3 is a graph which shows the effect of power on residual stress at defocus 0.45"
Figure 4:
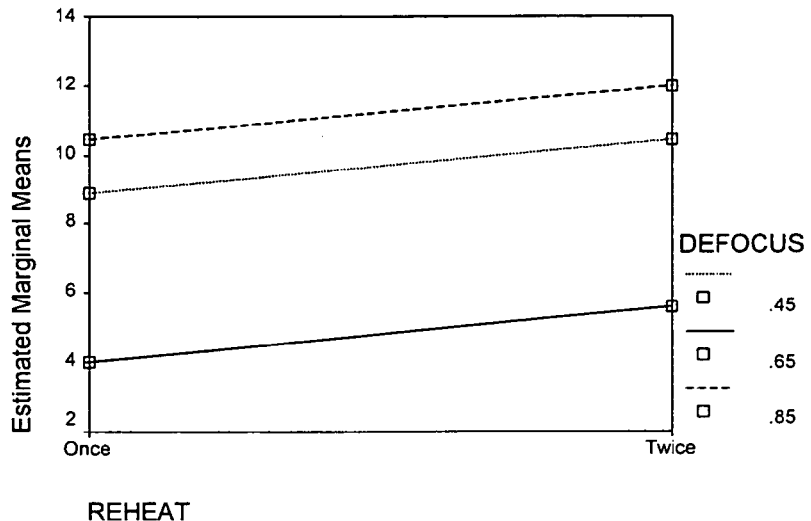
FIG. 4 is a graph which shows the effect of the number of reheat cycles on residual stress at a speed of 11.76 ipm.
Figure 5:
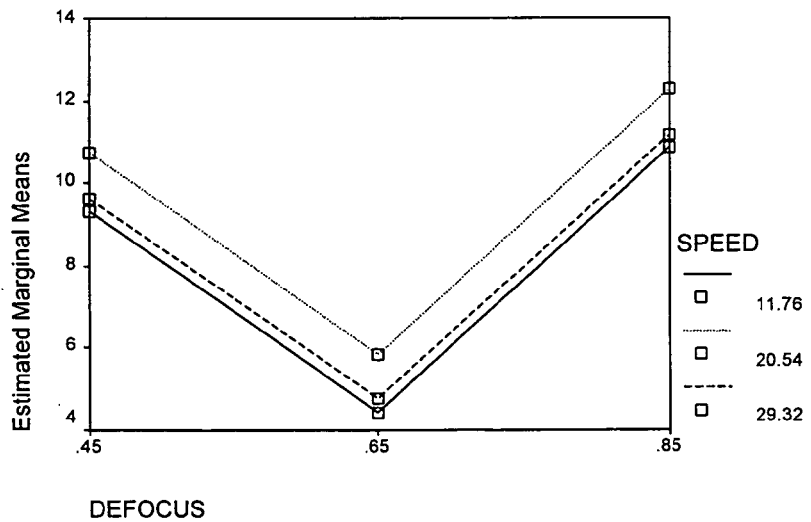
FIG. 5 is a graph which illustrates the effect of defocus on residual stress at a power level 170 W.
Figure 6:
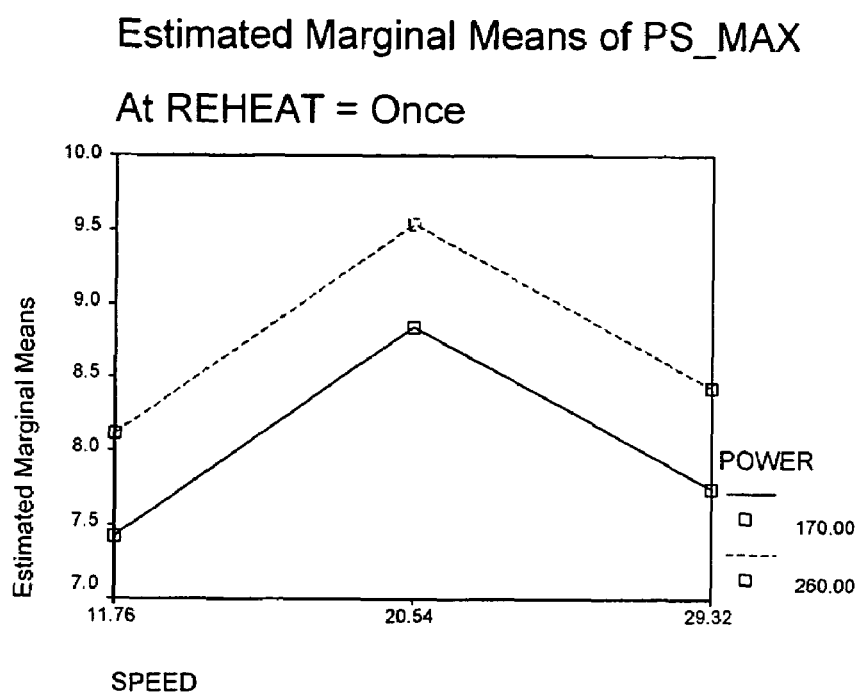
FIG. 6 is a graph which shows the effect of speed on residual stress at reheat "Once."

The measurement of the surface residual stress of the DMD H13 steel specimens (27 in total) was conducted by Lambda Research Inc. In this regard, an x-ray diffraction technique was employed for the assessment of the surface residual stresses at six locations as shown in FIG. 2. It is assumed that the measurement of the surface residual stresses at these six critical locations is sufficient to have an idea about the overall residual stress conditions in the sample. Longitudinal, 45-deg., and transverse residual stresses were measured at these locations for all of the twenty-four samples. These three components of residual stresses were then combined employing Mohr's Circle for determining the maximum principal stress, minimum principal stress and maximum shear stress. Among the principal and shear stresses, it is particularly important that maximum principal stress be kept as low as possible at all locations and as such it is the focal point of this report.

It is clear from Table 3 that reheating indeed reduced the principal residual stresses in the H13 DMD samples.

TABLE 3

Comparison of Principal Maximum residual stress between reheated and non-reheated samples.

| # of Samples | Category | Average Stress in ksi |
|---|---|---|
| 18 | All reheated | 9.4 |
| 3 | All reheating | 6.04 |
| 3 | No reheating | 18.84 |

In Table 3, two comparisons have been made. One with the non-reheated samples (3 samples) versus the whole reheated matrix (18 samples). But all these 18 samples were not made under the identical situation but all of these samples were reheated. Thus for better comparison, 3 reheated samples were compared with 3 non-reheated samples that were made using identical parameters except the reheating operation for former three samples.

Our next goal was to identify the parameter/parameters that have more influence than others to reduce the residual stress buildup in the DMD samples. In this experiment total 4 variables were under scrutiny. There are: laser power. Travel speed defocus and number of reheating cycle (in essence time of reheating). Statistical analysis for determining the effects of these variables is given below. Table 4 shows the statistical significant of each of this variable. Although different variable has varying amount of effect, none of them came out to be statically significant when 5% error rate is considered.

TABLE 4

ANOVA Table for testing statistical significance of the variables
Tests of Between-Subjects Effects
Dependent Variable: PS_MAX

| Source | Type III Sum of Squares | df | Mean Square | F | Sig. |
|---|---|---|---|---|---|
| Corrected Model | 153.566[a] | 6 | 25.594 | .562 | .752 |
| Intercept | 1335.903 | 1 | 1335.903 | 29.344 | .000 |
| POWER | 2.159 | 1 | 2.159 | .047 | .832 |
| REHEAT | 9.923 | 1 | 9.923 | .218 | .650 |
| DEFOCUS | 134.898 | 2 | 67.449 | 1.482 | .269 |
| SPEED | 6.587 | 2 | 3.294 | .072 | .931 |
| Error | 500.779 | 11 | 45.525 | | |
| Total | 2244.825 | 18 | | | |
| Corrected Total | 654.345 | 17 | | | |

[a]R Squared = .235 (Adjusted R Squared = −.183)

The same results may be shown graphically using the profile plots that are given from FIG. 3 through FIG. 6.

The invention claimed is:

1. A method of controlling residual stress in conjunction with an additive manufacturing process, comprising the steps of:
providing a substrate;
providing a deposition head including a laser outputting a laser beam surrounded by a metal powder feed;
heating a localized region of the substrate with the laser beam to create a melt pool while feeding metal powder into the melt pool to achieve the build-up of material in a deposition zone;
directing the beam of one or more lasers into the zone following the deposition of the material at a temperature less than the melting point of the material as a means of controlling residual stress; and
adjusting the location or intensity of the laser beam(s) used to control the stress to adjust the location and/or magnitude of the residual stress.

2. The method of claim 1, wherein the laser used to deposit the material is also used to control the residual stress.

3. The method of claim 1, wherein a plurality of lasers are used to control the cooling rate of the deposited material.

4. The method of claim 1, wherein the intensity of the laser beam is controlled through defocusing of the beam.

5. In a direct-metal deposition (DMD) process wherein a laser beam is used to melt a powder feed to deposit a material on a substrate, a method of controlling the build-up of residual stress, comprising the steps of:
providing a substrate;
providing a deposition head including a laser outputting a laser beam surrounded by a metal powder feed;
heating a localized region of the substrate with the laser beam to create a melt pool while feeding metal powder into the melt pool to achieve the build-up of material in a deposition zone; and
following the deposition path with a laser beam incapable of remelting the material as a means of controlling the build-up of residual stress.

6. The method of claim 5, wherein the laser used to deposit the material is also used to control the residual stress.

7. The method of claim 5, wherein a plurality of lasers are used to control the cooling rate of the deposited material.

8. The method of claim 5, wherein the location or intensity of the laser beam used to control the stress is varied to adjust the location and/or magnitude of the residual stress.

9. The method of claim 8, wherein the intensity of the laser beam is controlled through defocusing of the beam.

* * * * *